United States Patent [19]

Whipple, II

[11] Patent Number: 5,333,311
[45] Date of Patent: Jul. 26, 1994

[54] OPTIMIZING A MAGNETIC DISK BY ALLOCATING FILES BY THE FREQUENCY A FILE IS ACCESSED/UPDATED OR BY DESIGNATING A FILE TO A FIXED LOCATION ON A DISK

[75] Inventor: Albert E. Whipple, II, Kingwood, Tex.

[73] Assignee: ALSoft, Inc., Spring, Tex.

[21] Appl. No.: 625,067

[22] Filed: Dec. 10, 1990

[51] Int. Cl.$^5$ .............................................. G06F 12/00
[52] U.S. Cl. ...................... 395/600; 395/425; 395/275; 364/DIG. 1; 364/282.2; 364/245; 364/246.2; 364/248.1
[58] Field of Search ................ 364/200; 395/275, 700, 395/600, 425

[56] References Cited

U.S. PATENT DOCUMENTS

| | | | |
|---|---|---|---|
| 4,435,752 | 3/1984 | Winkleman | 364/200 |
| 4,536,837 | 8/1985 | Olson et al. | 364/200 |
| 4,542,458 | 9/1985 | Kitajima et al. | 364/200 |
| 4,642,763 | 2/1987 | Cummins | 364/200 |
| 4,680,703 | 7/1987 | Kriz | 364/200 |
| 5,119,291 | 6/1992 | Flannagan et al. | 395/275 |
| 5,131,087 | 7/1992 | Warr | 395/425 |

FOREIGN PATENT DOCUMENTS 2184267  6/1987  United Kingdom ......... G06F 12/02

OTHER PUBLICATIONS

Structured Computer Organization, Andrew Tanenbaum, 1984, pp. 321-322.
Users Manual for Norton Utilities Software, 1989, 1990.

Primary Examiner—Thomas C. Lee
Assistant Examiner—Larry J. Ellcessor
Attorney, Agent, or Firm—Mary J. Gaskin

[57] ABSTRACT

A method for automatically optimizing computer disks is disclosed which utilizes recorded file usage to determine this optimum location of files on the disk. Each file on the disk is assigned a priority, depending upon its characteristics and frequency of usage. The files on the disk are then reordered on the basis of their priorities (for instance, active files are grouped together in low-numbered sections and volatile files are grouped with free space), thereby minimizing seek time of disk access. The method can be done in the background and optimization can occur on a daily basis.

5 Claims, 6 Drawing Sheets

OPTIMIZING A MAGNETIC DISK BY ALLOCATING FILES BY THE FREQUENCY A FILE IS ACCESSED/UPDATED OR BY DESIGNATING A FILE TO A FIXED LOCATION ON A DISK

TECHNICAL FIELD

This invention generally relates to the storage of data on secondary computer memories and, more particularly, to a method of optimizing accesses to computer disks.

BACKGROUND OF THE INVENTION

A computer disk (or simply disk) is a data storage and retrieval device typically comprised of one or more circular recording surfaces connected by a common spindle that spins at high speeds. The data is accessed (i.e., either read or written) by a series of read-write heads, one head per recording surface. All read-write heads are attached to a single moving arm assembly, known as a boom, that moves in and out.

Each recording surface is divided into concentric zones called tracks. The length of each track is divided into a number of segments called sectors. Before a sector can be accessed, the sector must rotate until it is immediately adjacent to its read-write head. The set of tracks adjacent to all the read-write heads at a given instant in time is known as a cylinder.

To access a particular sector, the boom must be moved to the correct cylinder and then the sector must rotate until it is immediately adjacent to its read-write head. The time required to move the boom from one cylinder to another is known as seek time. The time required for a sector to move from its current position to a position immediately adjacent to its read-write head is called latency time.

Seek times are an order of magnitude greater than latency times. Thus, it is desirable to reduce the number of seeks and, when a seek is necessary, to move the boom across as few cylinders as possible.

Sectors are usually numbered, starting with number zero, from the first track on the first cylinder, moving from track to track in a single cylinder, and then moving from cylinder to cylinder. This numbering scheme positions sectors with consecutive numbers on the same cylinder or on an adjacent cylinder.

The operating system of a computer is responsible for allocating sectors to files and maintaining a table, commonly known as the directory, which contains a list of the files that are stored on the disk. The directory also relates which sectors are allocated to each file and which sectors are currently unallocated. The directory is typically stored on the disk in sectors reserved by the operating system for that purpose.

The number of sectors allocated to a file depends on the sector size and the size of the file. Most computer operating systems indiscriminately allocate sectors to a file wherever they are available. In addition, a nonconsecutive allocation scheme is usually used which allows files to become fragmented. Because files tend to grow or shrink over time, the amount of fragmentation can become severe.

To reduce the number and magnitude of seeks, it is desirable to have all sectors of a file stored in consecutively numbered sectors, and it is also desirable to have the files which represent the majority of disk accesses stored consecutively.

Numerous computer programs have been written whose purpose is to monitor and record file usage. In common use, these programs collect data on the number of accesses to each file and the changes in each file's size.

More numerous are computer programs that have been written to increase disk performance by copying files to a different and preferred set of sectors. These programs are referred to as disk optimizers. The simplest disk optimizers merely copy fragmented files to consecutive sectors. The problem with this approach is that as each file is copied, it trades 2 or more blocks of consecutive sectors for 1 block of consecutive sectors. This accelerates the fragmentation of the unallocated sectors and increases the likelihood of new files being fragmented.

More advanced disk optimizers completely reorder a disk by copying files to consecutive sectors, starting with the lowest numbered sector not occupied by the directory, such that no file is fragmented and no sectors are left unallocated between files. This results in all unallocated sectors having consecutive numbers and decreases the rate of future file fragmentation, since new files can easily be allocated to consecutive sectors.

While those advanced disk optimizers are able to eliminate the increased seek times that result from file fragmentation, they do not decrease the seek time required to move the boom from the sectors of one file to the sectors of another file. It is desirable that the files which represent the majority of disk accesses be grouped into neighboring sectors to reduce or eliminate the seek time required to access them.

Further, existing disk optimizers require the computer user to run the disk optimizer program and then start the optimization process. With today's computers, especially personal computers, being used by computer novices, this places an added burden on the user to remember to run the disk optimizer program on a regular basis.

SUMMARY OF THE INVENTION

An object of the present invention is to improve upon disk optimization by incorporating the methods used in file monitoring programs to record file usage and then to use the recorded information to determine the optimum location of files on a disk. It is another object of the present invention to relieve the computer user from the responsibility of disk optimization by having it operate as a background process that automatically optimizes disks on a daily basis.

The present invention monitors and records file usage. The file usage monitored and recorded is the number of accesses to each file and the number of changes in each file's size. In the preferred embodiment, the recorded file usage is stored in a file. The file contains only the file usage recorded from the current day and previous four days of computer use.

The present invention operates as a background process. As a background process, it operates, without terminating, by taking small amounts of CPU time to seemingly execute concurrently with other programs.

The present invention waits until each new day arrives and then optimizes each disk attached to the computer system, one disk at a time. During optimization, each file is assigned one of five priorities, depending on its recorded file usage and whether it can be moved.

The five priorities are anchored, active, volatile, sporadic and dormant. An anchored file is a file that must occupy the sectors that are currently allocated to it; it is usually a file that is accessed by a program that fails to consult the directory to find the current location of the file. A volatile file is a nonanchored file that has changed size at least once. An active file is a nonanchored, nonvolatile file with accesses representing one percent or more of the total accesses to all files. A sporadic file is a nonanchored, nonvolatile file which has some accesses but not enough accesses to be considered active. Finally, a dormant file is a nonanchored, nonvolatile file that does not have any accesses.

The files are reordered (copied to a new set of sectors) on the basis of their priority. All files with the same priority, except anchored files, are grouped into consecutive sectors such that no file is fragmented, except to span the sectors belonging to an anchored file, and no unallocated sectors or sectors belonging to files of another priority, except anchored files, are left between the files.

After reordering all nonanchored files, the group of active files occupies the consecutive block of sectors that starts with the lowest numbered sector not occupied by the directory. The group of volatile files occupies the consecutive block of sectors that immediately follows the active files. The unallocated sectors are grouped into the block of consecutive sectors that immediately follows the volatile files. The group of sporadic files occupies the consecutive block of sectors that immediately follows the unallocated sectors. Finally, the group of dormant files occupies the remaining block of consecutive sectors that immediately follows the sporadic files.

This ordering of the files is optimal because the invention: (1) groups the active files to reduce or eliminate the seek times of the vast majority of disk accesses; (2) groups the unallocated sectors to reduce the rate of new fragmentation; (3) locates the group of volatile files next to the unallocated sectors where they can grow to new sectors that are close to their original sectors; and (4) locates the group of sporadic files closer to the active files than it locates the group of dormant files.

BRIEF DESCRIPTION OF THE DRAWINGS

FIG. 6 is a diagram of a typical optimized volume, showing which areas of the disk are occupied by anchored, active, volatile, sporadic and dormant files.

DESCRIPTION OF THE PREFERRED EMBODIMENT

Figure 1:
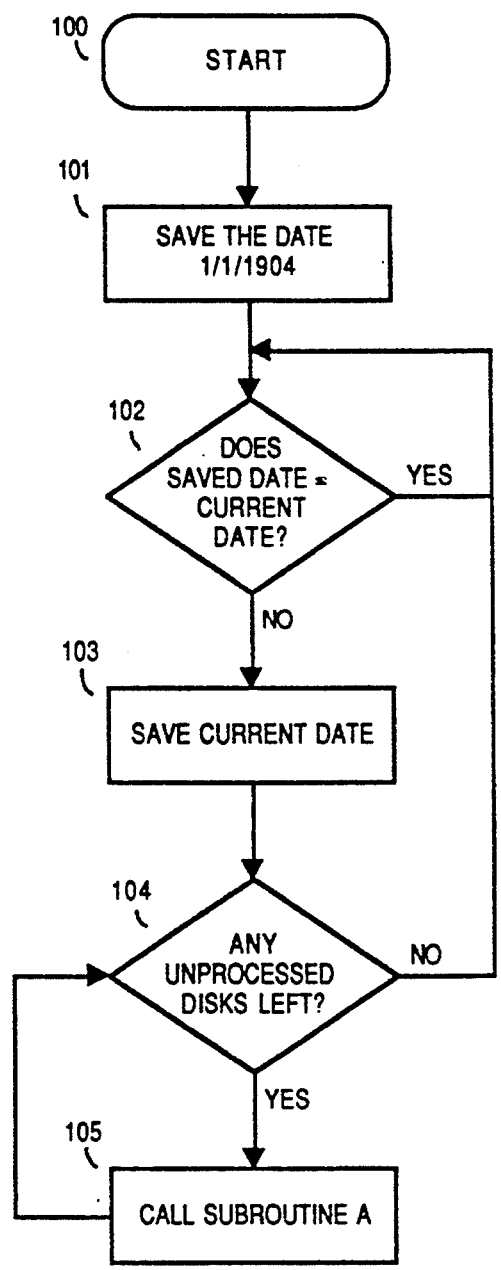
FIGS. 1, 2, 3, 6, and 5, taken together, are the overall flow diagram of the present invention.

The methods for monitoring and recording file usage and the methods for copying files from one set of sectors to another are generally well-known in the prior art. The methods for operating as a background process are well-known to those skilled in the art.

In the drawings, usual flow diagram conventions are followed. Specifically, a diamond-shaped block represents a logical operation, such as a test or compare function, and a rectangular-shaped block represents a step in a sequence of steps. Many such steps, however, are themselves performed by a series of steps, called subroutines, which are called in a manner understood by those skilled in the art. In the figures, the calling of a subroutine in noted by a reference to the subroutine in the rectangular block of a process step.

Referring now to the drawings, and more particularly to FIG. 1, the program starts at 100. The first operation performed is to save the date 1/1/1904 at block 101. Decision block 102 begins the loop that waits for the date to change. This loop is ultimately exited by a determination as to whether the current date equals the saved date. Assuming that the clock in the computer system is set correctly, this determination is initially negative since the saved date is 1/1/1904 and the invention was invented after 1904. Therefore, the flow chart proceeds to block 103 where the current date is saved for comparison when the flow chart eventually returns to decision block 102.

Figure 2:
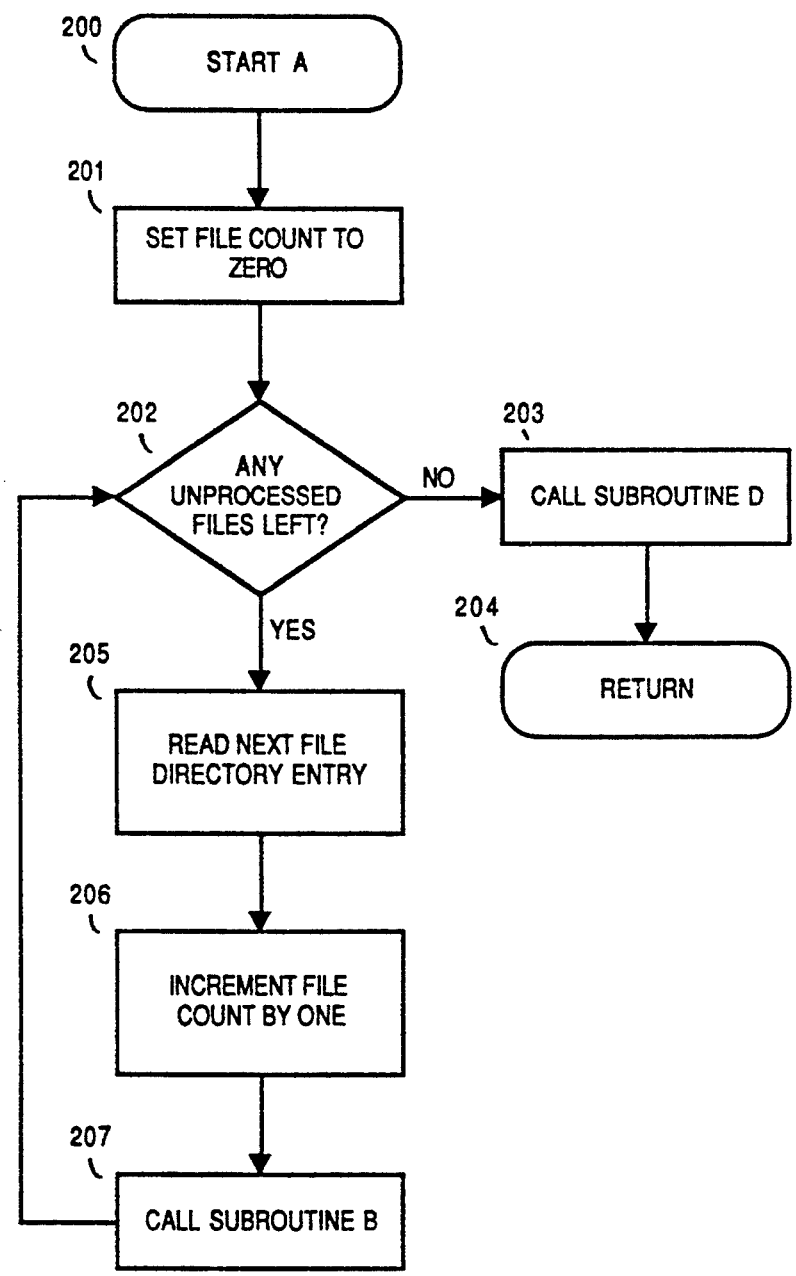

Decision block 104 begins the loop that optimizes each disk attached to the computer system. This loop is ultimately exited by a determination as to whether there are any disks left to optimize. Initially, however, this determination is affirmative, and, at block 105, a call to subroutine A, shown in FIG. 2, is made to optimize a disk. Upon return from subroutine A, the flow chart loops back to decision block 104 to again test whether there are any disks left to optimize. When this determination is finally negative, the flow chart loops back to decision block 102 to loop until a date change.

Figure 3:
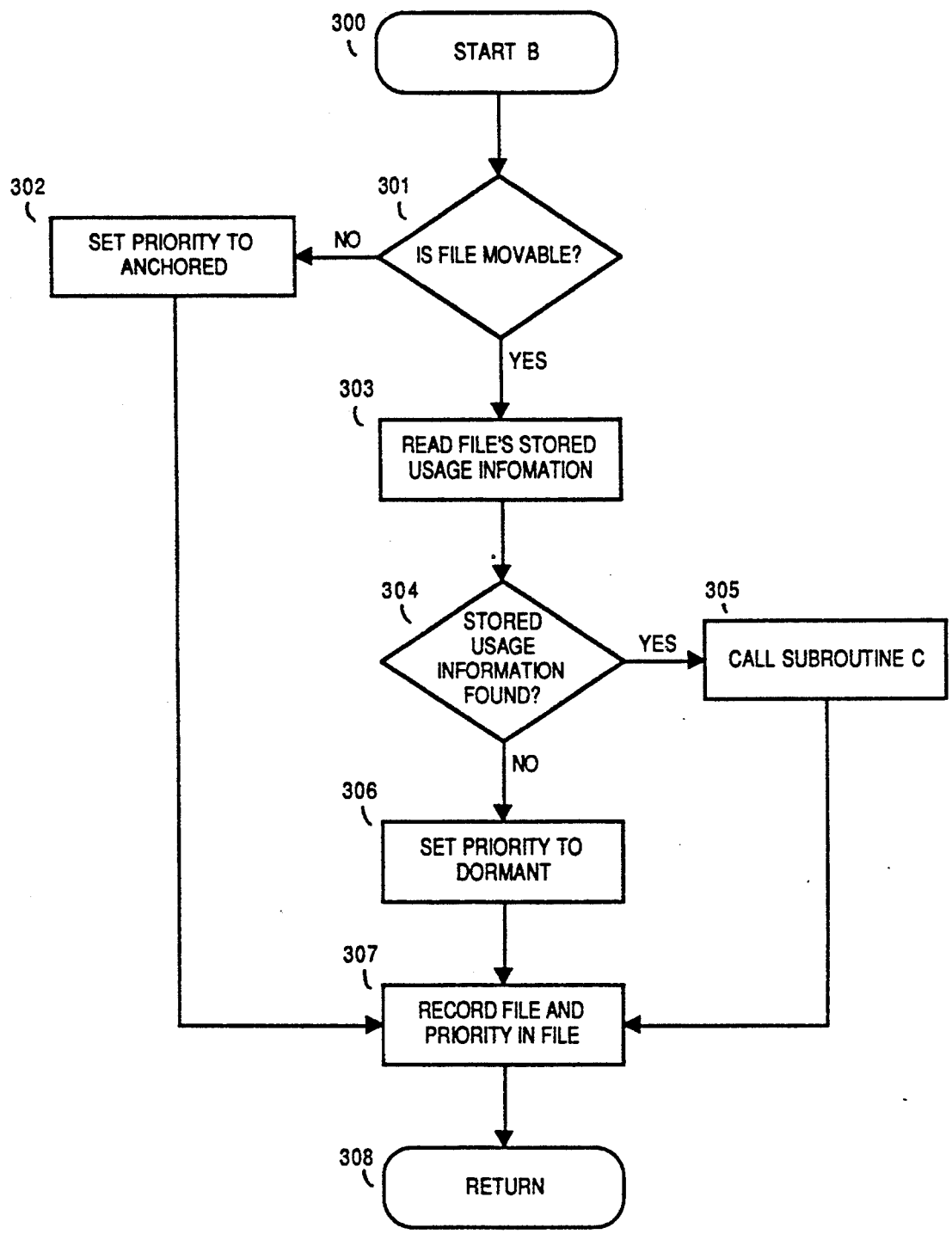
Figure 5:
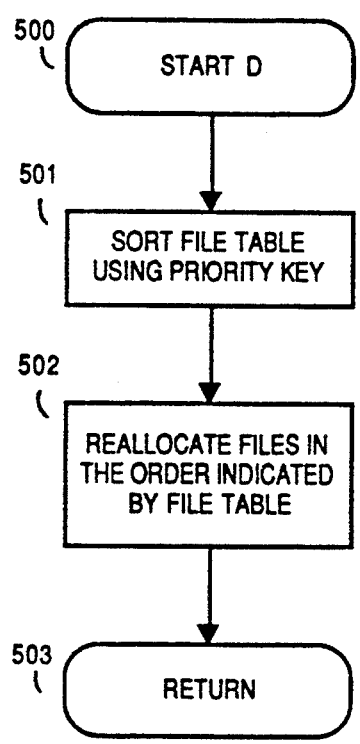

This completes the description of the main module of the invention. The various subroutines will now be described. The first of the subroutines is subroutine A which starts at 200 in FIG. 2. The first step at block 201 is to initialize a file count to zero. Decision block 202 begins the loop that assigns the priority to each file on the disk and adds the file and its priority to a file table. The priorities which are anchored, active, volatile, sporadic and dormant, are represented by the numeric values 0, 1, 2, 3 and 4, respectively. The loop at decision block 202 is ultimately exited by a determination as to whether there are any unprocessed files left. While the determination is affirmative, the flow chart proceeds to block 205 where the directory entry for the next file is read. At block 206, the file count is incremented by one. At block 207, a call to subroutine B, shown in FIG. 3, is made to determine the file's priority and to add the file and its priority to the file table. Upon return from subroutine B, the flow chart loops back to decision block 202 to again test whether there are any files left to process. When this test is finally resolved in the negative, the flow chart proceeds to block 203, where a call to subroutine D, shown in FIG. 5, is made to reorder the files. Upon return from subroutine D, the flow chart proceeds to 204, where subroutine A terminates and returns to its caller.

Figure 4:
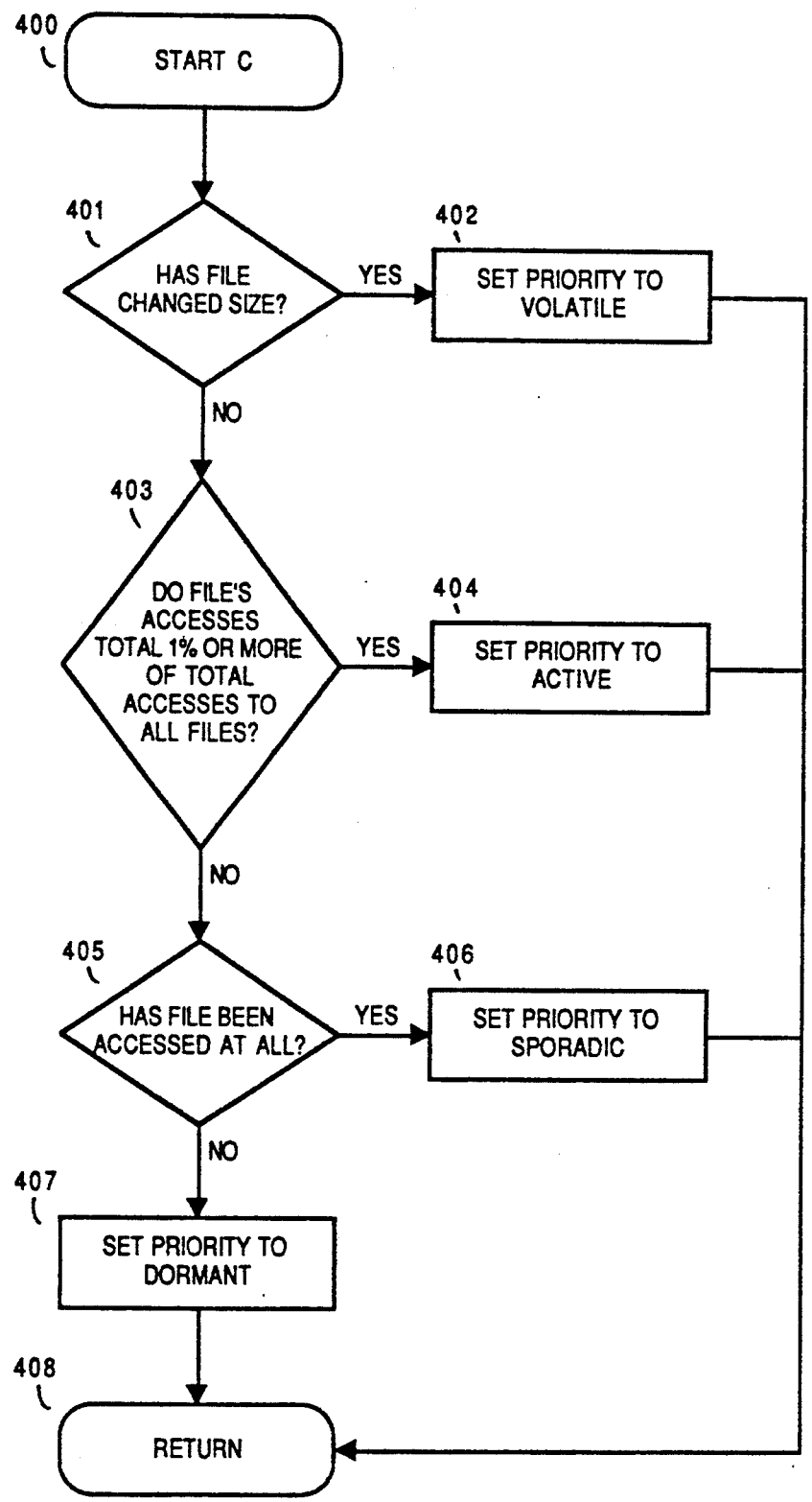

Subroutine B starts at 300 in FIG. 3. At decision block 301, a determination is made as to whether the file can be moved. The method for making this determination can be made in several ways. In the preferred and actually implemented embodiment, the determination is made by checking the file's type against a table containing the types of those files that cannot be moved. If the determination is negative, the flow chart proceeds to block 302, where the file's priority is set to anchored. At block 307 the file and its priority are stored in the file table. The flow chart then proceeds to 308 where subroutine B terminates and returns to its caller. If the determination at block 301 is affirmative, the flow chart proceeds to block 303 where the file's stored usage information is read. The decision block at 304 tests whether any usage information was found. If the test is resolved in the negative, then the priority is set to dormant at block 306, and the flow chart proceeds to block 307, which was previously described. If the test at decision block 304 is resolved in the affirmative, then a call to subroutine C, shown in FIG. 4, is made, where additional tests are performed to determine the file's priority. When subroutine C returns, the flow chart proceeds to block 307, which was previously described.

Subroutine C starts at 400 in FIG. 4. At decision block 401, the file's stored usage information is examined to determine whether the file has changed size. If the determination is affirmative, the priority is set to volatile at block 402. The flow chart then proceeds to block 408 where subroutine C terminates and returns to its caller. If the determination at decision block 401 is negative, then at block 403 the file's stored usage information is examined to determine whether the file's accesses total one percent or more of the total accesses to all files. If the determination is affirmative, the priority is set to active at block 404. The flow chart then proceeds to 408, which was previously described. If the determination at decision block 403 is negative, then at block 405 the file's stored usage information is examined to determine whether the file has been accessed at all. If the determination is affirmative, the priority is set to sporadic at block 406. The flow chart then proceeds to 408, which was previously described. If the determination at decision block 405 is negative, then at block 407 the priority is set to dormant and the flow chart proceeds to 408, which was previously described.

Subroutine D starts at 500 in FIG. 5. Before this subroutine is called, the file table will have an entry for each file on the disk. The file count indicates the number of entries in the table. Each entry contains the file and its assigned priority. At block 501, the table entries are sorted, in ascending order, using the numeric value of their priorities as the sort key. While there are many sorting algorithms available, in the preferred and actually implemented embodiment, the Quick Sort algorithm, known to those skilled in the art, is used. After sorting, all anchored files appear first in the table, followed in order by active files, volatile files, sporadic files and dormant files. At block 502, all files, excluding the anchored files, are reallocated to sectors, starting with the first sector not occupied by the directory, in the order that the files exist in the file table while grouping the unallocated sectors into a consecutive block of sectors following the volatile group and preceding the sporadic group. The flow chart then proceeds to block 503 where subroutine D terminates and returns to its caller.

Figure 6:
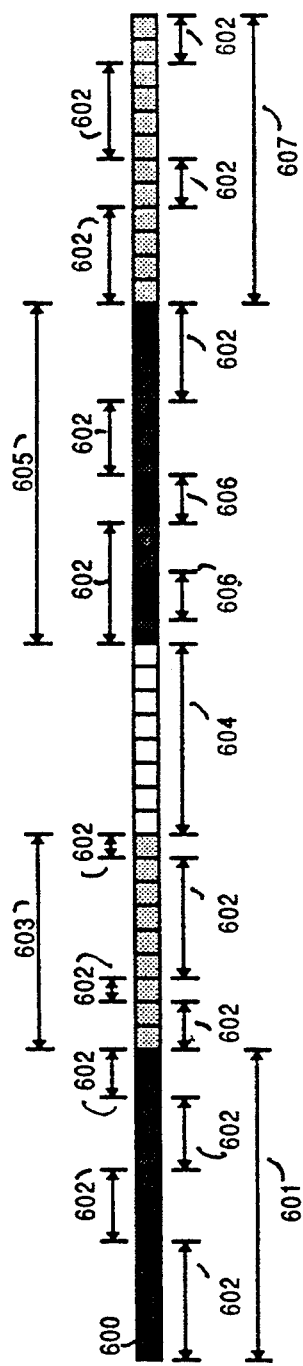

FIG. 6 depicts a typical optimized disk, with all the sectors strung end to end. Each square 600 represents one sector. Of course, a real disk has hundreds or thousands of sectors. The first sector 600 is the lowest numbered sector not occupied by the directory. Each nonanchored file 602 and each anchored file 606 occupies one or more sectors. The group of active files 601 occupies the first consecutive block of sectors. The group of volatile files 603 occupies the consecutive block of sectors that immediately follows the active files. The unallocated sectors 604 are grouped into the block of consecutive sectors that immediately follows the volatile files. The group of sporadic files 605 occupies the consecutive block of sectors that immediately follows the unallocated sectors. Finally, the group of dormant files 607 occupies the remaining block of consecutive sectors that immediately follows the sporadic files.

The invention has been described with respect to a preferred embodiment thereof, but it will be understood by those skilled in the art that changes may be made therein without departing from the spirit and scope of the invention.

What is claimed is:

1. A computer-implemented method of processing for allocating sectors to files on a computer disk to minimize the time required to access data on said computer disk, the computer-implemented method comprising the steps of:
   (1) continuously monitoring file usage for each of said files;
   (2) recording the file usage for said each of said files monitored;
   (3) assigning one of a plurality of priorities to said each of said files on the basis of the recorded file usage for said each of said files or the desirability of having a file of said files remaining allocated to a fixed set of sectors on said computer disk; wherein the plurality of priorities includes anchored indicating a file of said files must remain allocated to a fixed set of sectors on said computer disk, volatile indicating a file of said files has changed size, active indicating a file of said files has not changed size and has been accessed a total of one percent or more of the total accesses to all of the files, sporadic indicating a file of said files has not changed size and has been accessed less than one percent of the total accesses to all of the files, and dormant indicating a file of said files has not been accessed and has not changed size;
   (4) using the assigned priorities, determining an optimal set of sectors to be allocated to said each of said files by assigning anchored ones of said files to said fixed sectors on said computer disk, otherwise assigning connective sectors that are available on said computer disk to said files having the same priority;
   (5) reorganizing said files by copying said each of said files from its current location to the optimal set of sectors for said each of said files.

2. The method of claim 1 wherein the unallocated sectors are grouped into a block of consecutive sectors immediately following a group of files that has been assigned a priority corresponding to said group of files likelihood of requiring additional sectors during future usage.

3. The method of claim 1 wherein the steps 3, 4 and 5 of claim 1 are performed on a daily basis.

4. The method of claim 1 wherein the steps 3, 4 and 5 operate in the background by taking small amounts of CPU time to seemingly run concurrently with other programs without significantly impacting the overall performance of the computer.

5. The method of claim 1, wherein the files are assigned consecutive sectors with active files allocated to the first available consecutive sectors on the disk, followed by volatile files, then sporadic files, then dormant files.

* * * * *